(12) United States Patent
Bansal et al.

(10) Patent No.: US 7,257,083 B2
(45) Date of Patent: Aug. 14, 2007

(54) METHOD AND APPARATUS FOR POLICY-BASED DYNAMIC PREEMPTIVE SCHEDULING OF DATA TRANSMISSIONS

(75) Inventors: Deepak Bansal, Kent, WA (US); Whay Chiou Lee, Cambridge, MA (US)

(73) Assignee: Motorola, Inc., Schaumburg, IL (US)

( * ) Notice: Subject to any disclaimer, the term of this patent is extended or adjusted under 35 U.S.C. 154(b) by 926 days.

(21) Appl. No.: 10/603,559

(22) Filed: Jun. 25, 2003

(65) Prior Publication Data

US 2004/0264500 A1    Dec. 30, 2004

(51) Int. Cl.
*H04J 3/16* (2006.01)
*H04J 3/22* (2006.01)
(52) U.S. Cl. ............... 370/235; 370/230; 370/395.4; 370/395.41; 370/468
(58) Field of Classification Search ............... 370/230, 370/230.1, 231, 235, 252, 253, 395.4, 395.41, 370/395.42, 395.43, 468
See application file for complete search history.

(56) References Cited

U.S. PATENT DOCUMENTS

| 6,317,416 | B1 | 11/2001 | Giroux et al. | |
| 6,820,128 | B1 * | 11/2004 | Firoiu et al. | 709/233 |
| 6,961,307 | B1 * | 11/2005 | Aweya et al. | 370/230 |
| 6,996,062 | B1 * | 2/2006 | Freed et al. | 370/235 |
| 7,046,678 | B2 * | 5/2006 | Jiang et al. | 370/395.41 |
| 2002/0147022 | A1 | 10/2002 | Subramanian et al. | |

OTHER PUBLICATIONS

J. Liebeherr and D.E. Wrege, "Priority Queue Schedulers with Approximate Sorting in Output-Buffered Switches," IEEE JSAC, Jun. 1999. ftp://ftp.cs.virginia.edu/pub/jorg/papers/jsac699.pdf.

H. Zhang, "Service disciplines for guaranteed performance service in packet-switching networks", Proc. IEEE, 83(10):1374--96, Oct. 1995. http://citeseer.nj.nec.com/cache/papers/cs/16973/ftp:zSzzSzftp.cs.utexas.eduzSzpubzSztechreportszSztr96-02.pdf/goyal96starttime.pdf.

M. Shreedhar and G. Varghese, "Efficient Fair Queuing Using Deficit Round Robin", 1995. http://citeseer.nj.nec.com/cache/papers/cs/365/http:zSzSzwww.cs.wustl.eduzSzcszSztechreportszSz1994zSzwucs-94-17.pdf/shreedhar95efficient.pdf.

A. Demers, S. Keshav, and S. Shenker, "Analysis and simulation of a fair queuing algorithm", *Proc. SIGCOMM'89*, pp. 1-12, Austin, Texas http://www.acm.org/sigcomm/ccr/archieve/1995/jan95/ccr-9501-shenker.pdf.

S. J. Golestani, "A Self-Clocked Fair Queuing Scheme for Broadband Applications".

P. Goyal, H. M. Vin, and H. Cheng, "Start Time Fair Queuing: A Scheduling Algorithm for Integrated Services Packet Switching Networks".

D. Stilliadis and A. Verma, "Latency-rate servers: A general model for analysis of traffic scheduling algorithms", *IEEE/ACM Transactions on Networking*, 6(2):164--174, Apr. 1998. http://citeseer.nj.nec.com/cache/papers/cs/2814/http:zSzzSzwww.bell-labs.comzSzuserzSzstiliadizSzlr.pdf/stiliadis96latencyrate.pdf.

(Continued)

*Primary Examiner*—Ricky Q. Ngo
*Assistant Examiner*—Pao Sinkantarakorn

(57) ABSTRACT

To address the need for protecting the QoS of high priority flows in a communication network when network conditions vary, original queue weights (B) are modified by a bandwidth allocation adaptor. The modification of the original queue weights is based, in part, on channel conditions.

5 Claims, 7 Drawing Sheets

OTHER PUBLICATIONS

H. Wang, C. Shen, K. G. Shin, "Adaptive-Weighted Packet Scheduling for Premium Service", http://www.merl.com/papers/TR2001-07/.

P. Bhagwat, P. Bhattacharya, A. Krishna and S. K. Tripathi, "Enhancing throughput over wireless LANs using Channel State Dependent Packet Scheduling" IEEE Infocom 1996 http://citeseer.nj.nec.com/cache/papers/cs/16896/ftp:zSzzSzftp.ccs.neu.eduzSzpubzSzpeoplezSzmattazSzWirelesszSzPravinInfo96.pdf/bhagwat96enhancing.pdf.

R. Kautz and A. L. Garcia, "A Distributed Self-Clocked Fair Queueing Architecture for Wireless ATM Networks".

Wu, et al., "Fair Scheduling with Bottleneck Consideration in Wireless Ad-hoc Networks NS: Network Simulator", http://www.isi.edu/nsnam/ns.

A. K. Parekh and R.G. Gallager, "A Generalized Processor Sharing Approach to Flow Control in Integrated Services Networks", in *Proc. IEEE Infocom'93*, pp. 521-530, 1993. http://www.tecknowbasic.com/thesis.pdf http://www.comsoc.org/livepubs/50_journals/pdf/RightsManagement_eid=190987.pdf.

A. K. Parekh and R. G. Gallager, "A generalized processor sharing approach to flow control in integrated services networks", in *Proc. IEEE Infocom'92*, pp. 915-924, 1992.

Liu and Layland, "Scheduling Algorithms for Multiprogramming in a Hard-Real-Time Environment," J. of the ACM 20(1), 1973. * http://www.cs.wustl.edu/~venkita/publications/class/LiuLayland.pdf.

Bennett and Zhang, "Worst case fair weighted fair queuing", INFOCOM 96. http://citeseer.nj.nec.com/cache/papers/cs/2900/http:zSzzSzwww.cs.wisc.eduzSz~lhlzSzcs740zSzpaperszSzwf2q.pdf/zhang96wfq.pdf.

Hui Zhang and Domenico Ferrari, "Rate-Controlled Static-Priority Queuing," IEEE INFOCOM'93. http://citeseer.nj.nec.com/cache/papers/cs/16848/ftp:zSzzSzftp.icsi.berkeley.eduzSzpubzSztechreportszSz1992zSztr-92-003.pdf/zhang93ratecontrolled.pdf.

VIC: LBNL's video conferencing tool, http://www-nrg.ee.lbl.gov/vic/.

M. Podolsky, M. Vetterli, and S. McCanne, "Limited retransmission of real-time layered multimedia," Proc. IEEE Workshop on Multimedia Signal Processing, Dec. 1998.

K. Nichols, S. Blake, F. Baker and D. Black, "Definition of the Differentiated Services Field (DS) in the IPv4 and Ipv6 headers", RFC 2474, Dec. 1998. http://www.ietf.org/rfc/rfc2474.txt.

S. Blake, D. Black, M. Carlson, E. Davies, Z. Wang and W. Weiss, "An Architecture for Differentiated Services", RFC 2475, Dec. 1998. http://www.ietf.org/rfc/rfc2475.txt.

S. Shenker and J. Wroclawski, "General Characterization Parameters for Integrated Service Network Element", RFC 2215, Sep. 1997 http://www.ietf.org/rfc/rfc2215.txt.

Sandeep Bajaj, Lee Breslau and Scott Shenker, "Is Service Priority Useful in Packet Networks?", *Proceedings of ACM Sigmetrics '98*, pp. 66-77, Madison, Wisconsin, Jun. 1998. http://citeseer.nj.nec.com/cache/papers/cs/1710/http:zSzzSzwww.cs.wpi.eduzSz~sigmet98zSzbajaj/pdf/bajaj98is.pdf.

Whay C. Lee and Michael G. Hluchyj, "Dynamic Connection Management for Call-Level QOS Guarantee in Integrated Communication Networks," IEEE INFOCOM, 1994.

* cited by examiner

100

200

300

400

500

METHOD AND APPARATUS FOR POLICY-BASED DYNAMIC PREEMPTIVE SCHEDULING OF DATA TRANSMISSIONS

FIELD OF THE INVENTION

The present invention relates generally to packet switched communication systems and in particular, to a method and apparatus for policy-based dynamic preemptive scheduling of data transmissions within such communication systems.

BACKGROUND OF THE INVENTION

FIG. 1 is a block diagram of a prior-art system 100 for allocating bandwidth for, scheduling, and transmission of data packets within a packet switched communication system. Data packets associated with various flows arrive randomly and are kept in queues until they are transmitted or discarded. System 100 determines (along with other components), the Quality of Service (QoS) received by each flow, wherein QoS is based on a plurality of performance parameters including bandwidth, delay, and jitter. The QoS received by a flow is subject to constraints specified in a predetermined service level agreement, wherein the service level agreement is a contract that governs the behavior of a provider and a user of a service, namely data transmission. System 100 comprises bandwidth manager 101, packet scheduler 103, and packet handler 105.

Bandwidth manager 101 reserves an appropriate amount of bandwidth for each data flow when it is admitted based on its service level agreement. Bandwidth manager 101 additionally ensures that no new flow is admitted if its admission could result in violation of the service level agreements of existing data flows. Packet scheduler 103 allocates bandwidth for transmission of packets awaiting service in accordance with the bandwidth reservation determined by bandwidth manager 101. These packets are distributed among a plurality of data queues (not shown), each of which is associated with a particular service level. All packets in each queue are to be granted service that is commensurate with the corresponding service level agreement. Packet scheduler 103 uses a scheduling algorithm to establish an ordered list of packets that are pending service. In accordance with the ordered list of packets, packet handler 105 prepares the head of line packet for transmission whenever the next transmission opportunity becomes available.

Given a set of packets in a plurality of queues, a scheduler establishes an order for the packets to be transmitted. Such an order is typically based on static prioritization of the queues or dynamic assignment of priorities to packets at the heads of the queues. Whenever there is an opportunity to transmit a packet, the packet with the highest priority is granted that opportunity. Dynamic prioritization of packets is commonly derived from a set of queue weights, which reflect a desired bias in assigning priorities to packets at the heads of respective queues. These queue weights can be chosen to implement a predetermined fair bandwidth allocation policy that meets the QoS objective of active flows.

There exist many prior-art scheduling algorithms that are QoS based. Such schedulers are capable of providing service to a particular user with a guaranteed rate and bounded delay. Although such QoS-based schedulers are adequate for static channel conditions, most of them do not consider varying conditions of the network and its effect on QoS received by existing flows. Static resource allocation mechanisms can be rendered ineffective and unfair in environments where bandwidth demand fluctuates and resource availability may vary.

There exist scheduling algorithms that can adapt to variation in network conditions, such as offered loads and available bandwidth. Some of these prior systems dynamically distribute available bandwidth among packets in different queues by updating queue weights based on queue lengths. Such systems are inherently unfair for they favor users transmitting packets with excessive rates. Such systems are also ineffective in guaranteeing QoS since the QoS of every flow is subject to compromise in an event of decreased available bandwidth. Other prior systems that adapt to variation in network conditions exist for multi-channel communication networks. Such systems dynamically distribute transmission resources among different channels such that overall system throughput is maximized. Brute-force maximization of system throughput by favoring transmission in good channels is inherently unfair. Moreover, these systems are also ineffective in guaranteeing QoS since all users transmitting packets over poor channels are penalized.

An additional scheduling algorithm is described in U.S. Pat. No. 2002/0147022A1, METHOD FOR PACKET SCHEDULING AND RADIO RESOURCE ALLOCATION IN A WIRELESS COMMUNICATION SYSTEM. This system provides a method of scheduling packet transmission that takes into consideration radio resource allocation at a wireless access node serving a plurality of cells, wherein each cell includes a base station and a plurality of mobile stations. The method uses an estimated transmit power level and an average effective data rate of all base stations in the system to determine a tentative transmission schedule for each of the mobile stations, wherein the tentative transmission schedule is modified for transmission in each cell based on current radio conditions in the cell. The tentative transmission schedule is chosen to maximize the value of a predetermined utility function, which can be configured to implement a desirable trade-off between system throughput maximization and fairness. A goal of the modified transmission schedules in this prior-art system is to offer an advantage to mobile stations in cells with good channel conditions to maximize efficiency, while ensuring fair resource allocation among all mobile stations. In the prior-art system, mobile stations in different cells are dynamically assigned priorities in reverse order of their current effective data rates relative to their respective average effective data rates. Although this prior-art system is adaptive to variation in network conditions, it is ineffective in guaranteeing QoS when available network resources fall short of that needed to sustain current offered load.

In many emerging networks, such as those supporting mission critical applications, it is necessary to protect the QoS of mission critical flows against variation of network conditions. Since prior-art QoS-based scheduling algorithms are deficient when scheduling packets on such communication systems, a need exists for a method and apparatus for dynamic preemptive scheduling data within such communication systems, wherein the QoS of high priority flows is protected against variation in network conditions at the expense of the QoS of low priority flows.

DETAILED DESCRIPTION OF THE DRAWINGS

To address the need for protecting the QoS of high priority flows in a communication network when network conditions vary, original queue weights (B) are modified by a bandwidth allocation adaptor. The modification of the original queue weights is based, in part, on channel conditions.

The present invention encompasses an apparatus comprising a preemption manager having as an input, a Quality of Service (QoS) and channel conditions and outputting preemption values. The apparatus additionally comprises a bandwidth allocation adaptor having as an input a first set of queue weights, channel quality information, and the preemption values, and outputting modified queue weights based on the first set of queue weights, the channel quality information, and the preemption values.

The present invention additionally encompasses an apparatus comprising a bandwidth allocation adaptor having a channel quality vector ($\sigma$) as an input and outputting a set of queue weights (B') based on the channel quality information.

The present invention additionally encompasses a method comprising the steps of receiving channel conditions ($\sigma$) and calculating queue weights (B') based on the channel conditions.

The present invention additionally encompasses a method comprising the steps of receiving channel conditions ($\sigma$), preemption values (P), and original queue weights (B). Modified queue weights (B') are calculated based on $\sigma$, P, and B.

Figure 1:
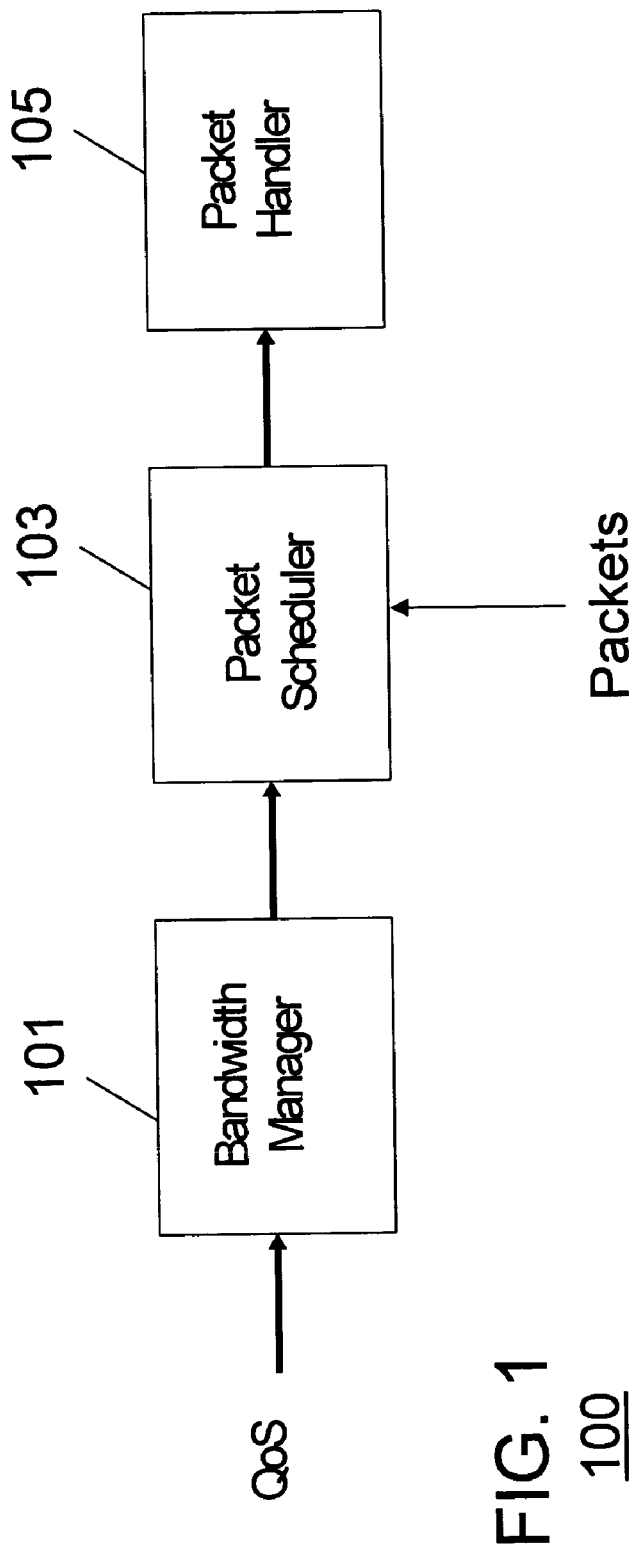
FIG. 1 is a block diagram of a prior-art data scheduler.
Figure 2:
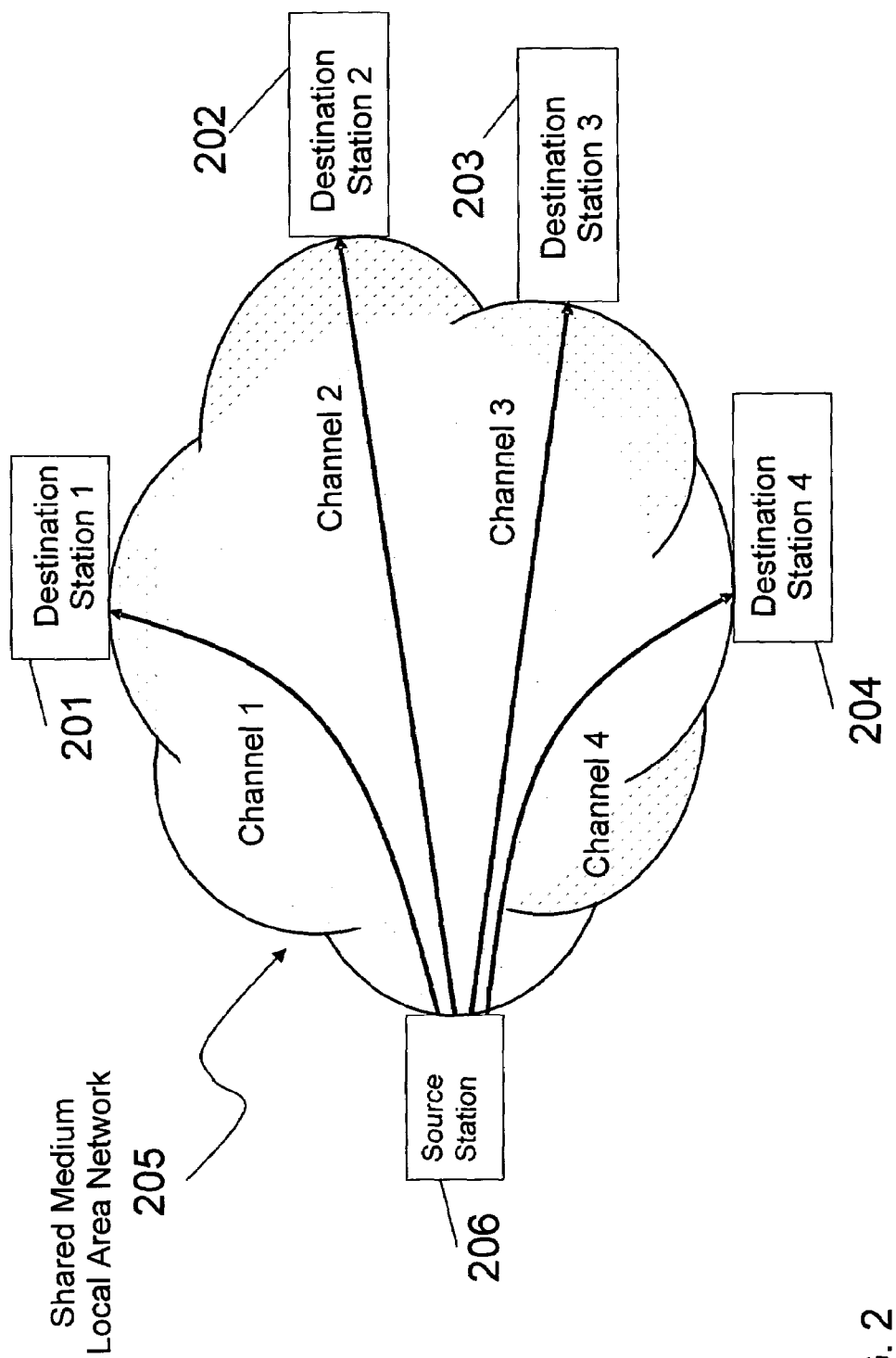
FIG. 2 is a communication system that requires packet scheduling in accordance with the preferred embodiment of the present invention.

Turning now to the drawings, wherein like numerals designate like components, FIG. 2 is a block diagram of communication system 200 in accordance with the preferred embodiment of the present invention. Communication system 200 is a shared medium network that supports a population of geographically distributed stations 201-204. As shown, each station 201-204 is coupled to source station 206. Communication between source station 206 and stations 201-204 occur over local area network 205 via virtual channels. The quality of a channel depends not only on the physical conditions of the channel but also on the location of source 206 and destination stations 201-204. Each channel is associated with a source station 206 and destination station 201-204. For simplicity and without loss of generality, FIG. 2 shows single source station 206, however one of ordinary skill in the art will recognize that multiple source stations may exist with in communication system 200. Each channel between a source station and a destination station is referred to as an inter-nodal channel. Due to location dependency and time varying channel impairments, the packet loss probability and hence the effective link rate in the network may vary from channel to channel.

The throughput of a shared medium depends on its offered load. Typically, the throughput increases with offered load when the offered load is light. As the offered load becomes high, the throughput gradually tapers off with further increase in offered load. A medium access control (MAC) algorithm is used to coordinate access to a shared medium network. In contention-based systems in particular, the diminishing rate of increase in throughput with increasing offered load is largely due to increasing collisions. When there is a collision, packets involved in the collision are considered lost. A collision resolution algorithm is needed to resolve collisions. In contention-free systems, a scheduling algorithm schedules transmissions from the various stations such that collisions are avoided.

In the following discussion, it is assumed that a bandwidth manager is available to control admission such that rate of packet loss due to collisions is bounded from above by a predetermined value when the channel conditions are good. Let C denote a nominal link rate of the system, i.e., the maximum throughput achieved by the system when there is no prevailing impairment in the channel used by the station. The bandwidth manager ensures that no new flow is admitted to the system unless the sum of the allocated bandwidth of each admitted flow originated by each station, and the bandwidth that is to be allocated to the incoming flow, does not exceed C.

As is evident, the communication system of FIG. 2 is a multi-channel communication system, wherein each channel is associated with a pair of source station and destination station. Let L denote the number of such channels. In practice, the link rate in each of these channel is subject to change due to time-varying channel conditions. Let $\sigma(j)$ denote a link quality factor in channel j for j=1, 2, ..., L. $\sigma(j)$ reflects the quality of the channel by accounting for loss in throughput due to error losses in the channel.

As discussed above, prior-art QoS-based scheduling algorithms fail to adequately protect the QoS of high priority flows against variation in channel conditions. In order to address this need, in the preferred embodiment of the present invention a scheduling algorithm is proposed that specifically addresses changing channel conditions. More particularly, a Channel-Dependent Hierarchical Adaptive Rate-based Multi-priority (CHARM) scheduler is provided that makes policy-based decisions so that the QoS and performance of the scheduler is enhanced especially under changing channel conditions.

Figure 3:
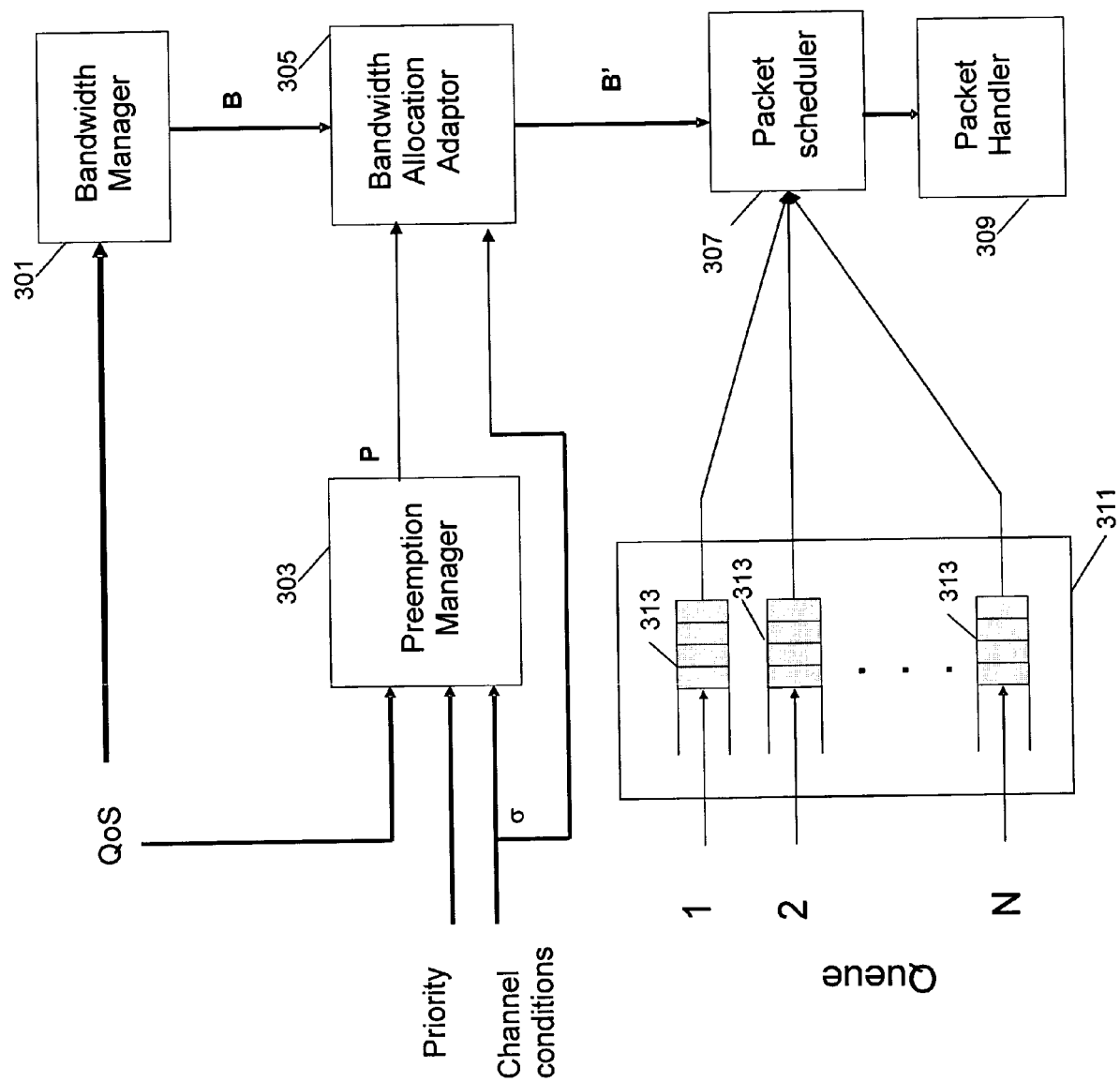
FIG. 3 is a block diagram of a scheduler in accordance with the preferred embodiment of the present invention.

FIG. 3 is a block diagram of scheduler 300 in accordance with the preferred embodiment of the present invention. In the preferred embodiment of the present invention scheduler 300 resides in source station 206 of communication system 200. As shown, scheduler 300 comprises bandwidth manager 301, preemption manager 303, bandwidth allocation adaptor 305, packet scheduler 307, packet handler 309, and buffer 311.

During operation packets enter buffer 311 where they are appropriately buffered. In particular, buffer 311 comprises a plurality of data queues 313, each comprising a data flow from a single user, or alternatively, each comprising data in flows from several users having the same QoS requirements. To each queue 313, bandwidth manager 301 assigns a weight that allows packet scheduler 307 to appropriately order the transmission of data from queues 313 such that each queue receives a portion of available bandwidth in accordance with its weight.

Bandwidth manager 301 determines, based on a predetermined bandwidth management algorithm, original queue weights (B) based on QoS requirements, and provides the weights to bandwidth allocation adaptor 305. Specifically, the queue weights (B) are selected for the queues such that their corresponding QoS requirements can be met under normal operational conditions. Bandwidth allocation adaptor 305 modifies the weights of queues 313 in accordance with predetermined policy requirements. In particular, bandwidth allocation adaptor has channel conditions (σ), preemption values (P), and original queue weights (B) as inputs, and calculates modified queue weights (B') based on τ, P, and B. The modified weight for each queue is then provided to packet scheduler 307 by bandwidth allocation adapter 305, with each weight being a function of channel condition as well as other variables.

Preemption manager 303 translates the policy requirements associated with the queues into a plurality of preemption classes. These preemption classes are provided to bandwidth allocation adaptor 305 for adaptive bandwidth allocation in the events of varying channel conditions. Specifically, when a channel is degraded such that the available bandwidth is insufficient to meet the service level agreements of all existing flows, some flows will be preempted so that the QoS of other flows may be preserved. The ordered list of preemption classes is used to determine the order in which flows belonging to the various classes are favored in QoS preservation as well as how flows are preempted in the event that preemption is needed.

A preemption of a flow may be one of a hard preemption and a soft preemption. A hard preemption of a flow is a preemption by which the flow is completely deprived of further transmission opportunities for its packets. A soft preemption of a flow is a preemption by which the flow is deprived of a finite number of transmission opportunities for its packets. In accordance with the present invention, preemption is generally a soft preemption. It is straightforward for one skilled in the art to extend the system to accommodate hard preemption. Specifically, this would require additional functions to remove a flow that is hard preempted and drop all queued packets that belong to the hard preempted flow.

Based on the preemption information, the channel conditions, and the queue weights provided from bandwidth manager 301, bandwidth allocation adaptor 305 modifies the queue weights and transmits the modified queue weights to packet scheduler 307. Packet scheduler 307 uses a scheduling algorithm to establish an ordered list of packets that are pending service. In accordance with the ordered list of packets, packet handler 309 prepares the head of line packet for transmission whenever the next transmission opportunity becomes available.

Figure 4:
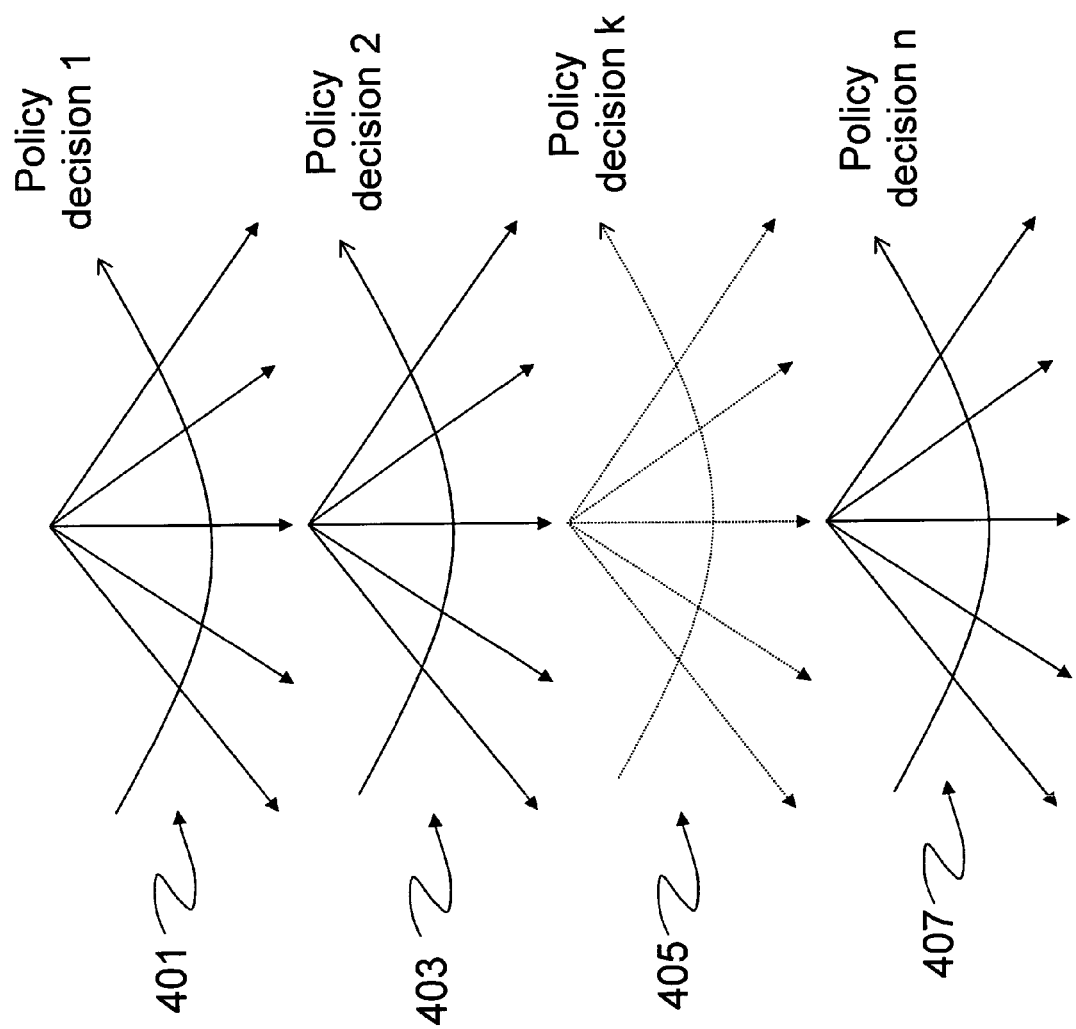
FIG. 4 and FIG. 5 illustrate hierarchical policy-based decision trees.

FIG. 4 illustrates a generic policy-based hierarchical decision tree 400 that is used by preemption manager 303 to determine the preemption class for each flow (queue 313) and establish an ordered list of these classes. Each level 401-407 along tree 400 represents a decision regarding a classification criterion for flows. Each leaf node on decision tree 400 represents a preemption class and the ordering of these classes in an in-order traversal of tree 400 sorts these classes in an ordered list. In an in-order traversal of a tree, all nodes of the tree are processed by recursively processing the left sub-tree, then the root, and finally the right sub-tree. In other words, a node on the tree is visited after all of its left descendants have been visited, but before any of its right descendants is visited.

Consider a simple example where decision tree 400 consists of only one level. Suppose that the classification criterion is based on traffic priority (e.g., in accordance with IEEE 802.1p traffic prioritization) and an in-order traversal of tree 400 orders these classes in the order of their priority (from highest priority to the lowest). Then, when there is insufficient bandwidth to preserve the QoS of all existing flows, bandwidth allocation adaptor 305 will attempt to satisfy the service level agreements of flows of high priorities at the expense of soft preempting flows of low priorities. An alternative classification criterion, where different flows may require different bandwidth, is to allocate bandwidth based on the amount of bandwidth required by each flow. Specifically, the classification criterion may be used to implement a channel packing policy for it is known that an efficient way of packing a given channel is to allocate bandwidth to flows in descending order of bandwidth requirements. Alternatively, by classifying flows in ascending order of bandwidth requirements, it may be used to implement a policy that maximizes the number of flows whose service level agreements are protected. Where there are multiple channels (e.g., due to multiple geographically distributed receivers), the classification criterion may be based on the condition of each channel, for it is known that the overall throughput can be maximized by favoring transmissions over channels with high available throughput.

Figure 5:
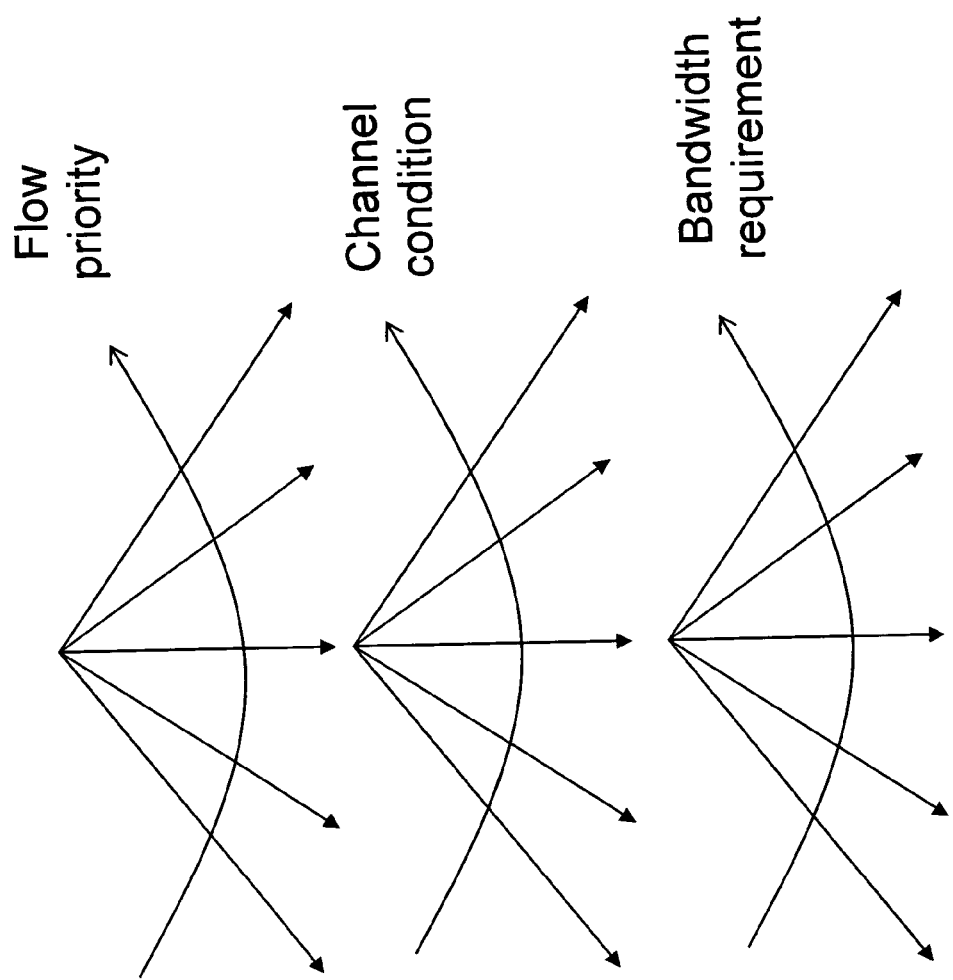

In an alternate embodiment of the present invention, multiple levels of classification criteria are established on decision tree 400. For example, any combination of the above three classification criteria can be accommodated by the method described above. FIG. 5 shows decision tree 500 that uses three level hierarchy with the IEEE 802.1p prioritization used at the highest level for classification, then, the channel condition for the various flows at the next level and the bandwidth requirement of the various flows at the lowest level.

As discussed above, preemption manager 303 adaptively updates bandwidth allocations based on channel conditions. In the preferred embodiment of the present invention, this is specifically accomplished utilizing a policy-based hierarchical decision tree to establish an ordered list of preemption classes, wherein each preemption class is associated with a queue. Each preemption class associated with a queue is assigned a preemption priority, which is different from the scheduling priority or queue weight associated with the queue. The scheduling priority is a value assigned to the queue to influence scheduling decisions such that the queue will not be serve unless all queues of higher priorities are empty. The queue weight is a value determined by a bandwidth manager based on QoS requirements such that transmission opportunities are provided to the queue in a proportion reflected by the queue weight. The preemption priority is a value derived based on prevailing conditions in accordance with the policy-based hierarchical decision tree.

Consider an application of the present invention as shown in FIG. 3 to a multi-channel communication system as shown in FIG. 2. Without loss of generality, let each flow or aggregate flow of packets associated with a queue be referred to simply as a flow. Let N denote the total number of flows originated in a predetermined source station in the communication system. The policy-based hierarchical decision tree assigns a preemption priority value $p_k$ with each flow k, wherein $p_k \in \{0, 1, 2, \ldots, P\}$ and k=1, 2, ..., N. Preemption priority value 0 indicates the lowest preemption priority, and preemption priority value P>0 indicates the highest preemption priority. Also, each flow k has an associated bandwidth allocation $b_k$ that was negotiated at the time of admission control by bandwidth manager 301. The variable $b_k$ is referred to as a nominal allocated bandwidth for flow k, since this amount of bandwidth may not be achievable under preemption. Note that there is no loss of generality even if some flows, such as best effort flows, do not in practice specify any bandwidth requirements. One option to handle these flows is to provide them with predetermined default bandwidth requirements. An alternative is to assign these flows the lowest preemption priority.

A variable $B_j$ is defined to be an aggregate nominal channel bandwidth allocation in channel j. Let $F_j$ denote the set of indices of flows that are allocated bandwidth on channel j. Then, the following expression for $B_j$ is obtained.

$$B_j = \sum_{k \in F_j} b_k$$

Further define $B_T$ to be an aggregate nominal bandwidth allocated to the source station, wherein $$B_T = \sum_{j=1}^{L} B_j = \sum_{j=1}^{L} \sum_{k \in F_j} b_k,$$

where L is the number of channels in the multi-channel communication system.

The variable $a_k$, for k=1, 2, . . . , N, is defined to be the index of the channel over which flow k has a nominal bandwidth allocation. In other words, $a_k$=j for all k in the set $F_j$.

In order to ensure a minimum level of fairness, the preferred embodiment of the present invention defines a configurable parameter f, which denotes a fraction of $B_T$, wherein $f.B_T$ represents the maximum allocated bandwidth that may be used for preserving allocated bandwidth for selected flows. The following table outlines the variable utilized by preemption manager 303 in determining preemption priority values in accordance with the preferred embodiment of the present invention.

| Notation | Definition |
| --- | --- |
| C | Nominal link rate. |
| σ(j), j = 1, 2, . . . , L | Link quality in channel j; 0 < σ(j) ≤ 1 |
| $b_k$, k = 1, 2, . . . , N | Nominal allocated bandwidth (queue weights) for flow k. |
| $p_k$, k = 1, 2, . . . , N | Preemption priority for flow k. |
| $a_k$, k = 1, 2, . . . , N | Index of the channel over which flow k has a nominal bandwidth allocation. |
| $F_j$, j = 1, 2, . . . , L | Set of indices of flows that are allocated bandwidth on channel j. |
| $B_j$, j = 1, 2, . . . , L | Aggregate nominal channel bandwidth allocation in channel j |
| $B_T$ | Aggregate nominal bandwidth allocated to the station. |
| f | Maximum fraction of $B_T$ allowed for rate protection; 0 ≤ f ≤ 1 |

Variable utilized in determining preemption priority values.

In the preferred embodiment of the present invention preemption manager utilizes the following algorithm to determine preemption priority values ($p_k$) for the k flows:

Consider a source station with N−1 active flows. Suppose that bandwidth manager 301 has newly admitted a flow N. Due to admission control, which prevents over-subscription of available bandwidth, it is necessary that, for j=1, 2, . . . , L, $$B_j = \sum_{k \in F_j} b_k \leq B_T = \sum_{k=1}^{N} b_k \leq C.$$

-continued

Note that $$\sum_{k=1}^{N} \frac{b_k}{C} \leq 1$$

and $$\sum_{k=1}^{N} \frac{b_k}{B_T} = 1.$$

Under normal operation, flow k is allocated a share $s_k$ of $B_T$, wherein $$s_k = \frac{b_k}{B_T} \geq 0.$$

For a flow, with a nominal bandwidth allocation $b_k$, to have its throughput preserved as the link rate degrades from C to σ(j)C<C, it is necessary that the flow's share of $B_T$ is upgraded as follows (albeit possibly at the expense of the shares available to other flows)

$$s'_k = \frac{b_k}{B_T \sigma(j)} > s_k.$$

Preemption manager 303 and bandwidth allocation adaptor 305 maintain a timely estimate of the current channel quality factor σ(j) to each receiver j (it is assumed that different receivers may have different channel characteristics). Each time a packet is transmitted, the bandwidth estimate is updated based on observable channel statistics. In the preferred embodiment of the present invention this is determined as described in U.S. patent application Ser. No. 10/439,788, however one or ordinary skill in the art will recognize that channel quality may be determined in other manners as well.

In accordance with the preferred embodiment of the present invention, the bandwidth allocations (queue weights ($b_k$)) to the various flows are dynamically updated by bandwidth allocation adaptor 305 and given as input to a weighted fair queuing scheduling algorithm. Although a variety of weighted fair queuing algorithms may be used, in the preferred embodiment of the present invention a Self-Clocked Fair Queuing (SCFQ) algorithm is utilized.

As one of ordinary skill in the art will recognize, an SCFQ scheduler maintains a variable (called system virtual time) that is used to track the amount of service that should be received by the various backlogged flows at a particular time. With each flow, is maintained a variable (called finish time) that represents the amount of service that has been received by a particular flow. It is used to compute the finish time of the head of line packet for a particular flow. The system virtual time and the finish times of the various backlogged flows are then, used to establish an ordered list of head of line packets for each flow.

Whenever a packet is to be de-queued for transmission, the current bandwidth estimates are used to update the bandwidth allocations as follows (note that bandwidth allocations may be updated at a lower frequency than each packet transmission to ensure that the scheduler is relatively stable). First, without loss of generality, the flows are rearranged by bandwidth allocation adaptor 305 in the order of decreasing priority as determined by preemption manager 303 utilizing the hierarchical policy based decision tree. Specifically, as each of the N queues has been assigned its own preemption priority, the queues can be rearranged such that their corresponding preemption priorities, $p_1$ through $p_N$, satisfy the following condition: $P_r \geq p_s$ if $1 \leq r < s \leq N$.

Figure 6:
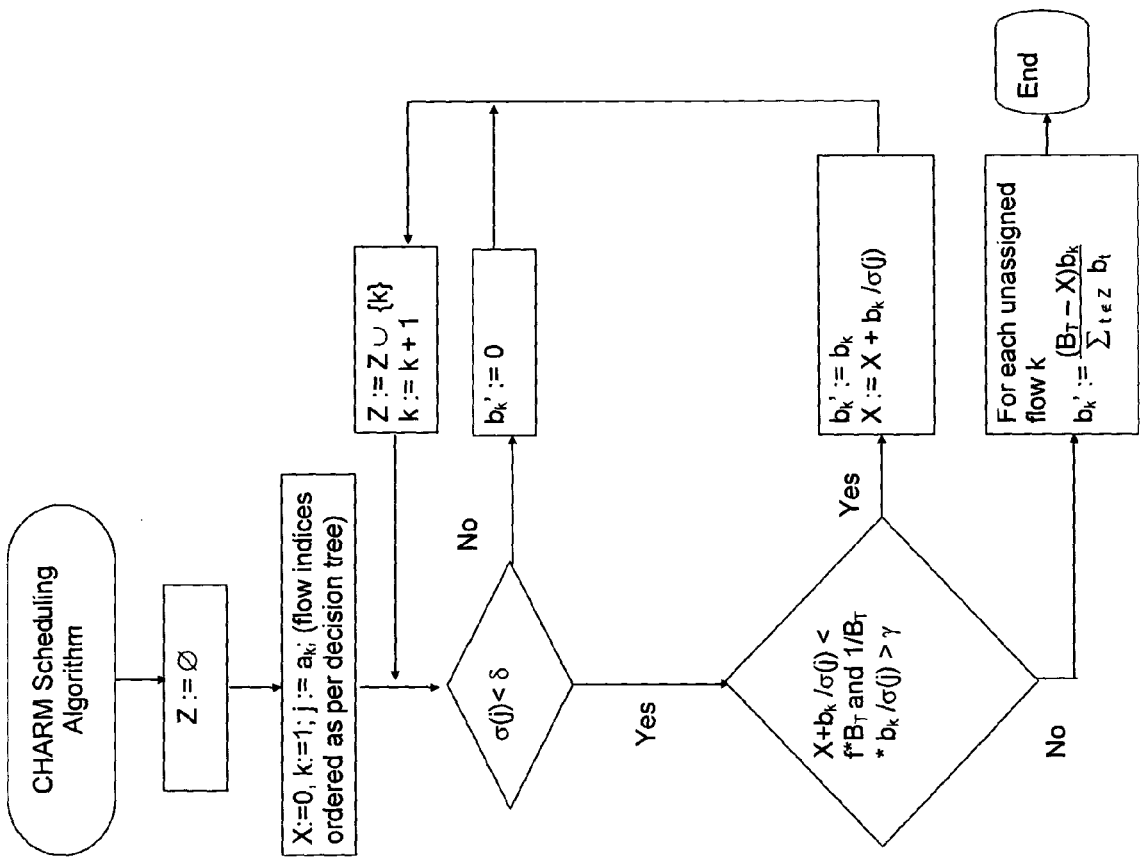
FIG. 6 is a flow chart showing operation of the scheduler of FIG. 3 in accordance with the preferred embodiment of the present invention.

In one embodiment of the present invention, the preemption priorities associated with the N queues are distinct, such that $p_r > p_s$ if $1 \leq r < s \leq N$. Following the ordered list generated from the hierarchical policy based decision tree, the updated bandwidth allocations for the N queues $b_k'$, for k=1, 2, ..., N, are calculated below and with reference to FIG. 6:

$X := 0;$ $Z := \emptyset$

For $k = 1$ to $N$ {

$\quad j := a_k$ $\quad$ If $(\sigma(j) < \delta)$ /*channel too bad*/

$\quad\quad b_k' := 0$ $\quad$ else if $\left(\left(X + \dfrac{b_k}{\sigma(j)} \leq f * B_T\right)$ and $\left(\dfrac{1}{B_T} \dfrac{b_k}{\sigma(j)} < \gamma\right)\right)$ $\quad\quad X : X + \dfrac{b_k}{\sigma(j)}$ $\quad\quad b_k' := b_k$ $\quad\quad Z : Z \cup \{k\}$

}

For each unassigned flow $k \notin Z$ $\quad b_k' := \dfrac{(B_T - X)b_k}{\sum_{t \notin Z} b_t}$ In each step of the above algorithm, a queue is considered and its updated bandwidth allocation is determined. As is reflected by the order of indices from k=1 to k=N, the updated bandwidth allocations of the queues are determined in an order from the queue with the highest preemption priority to the queue with the lowest preemption priority. A set Z is used to keep track of queues for which updated bandwidth allocations have been determined. To track the amount of allocated bandwidth in each step of the algorithm, a cumulative sum of bandwidth allocations (X) is defined by adaptor 305, which is initialized to 0. When a queue is considered, the channel in which packets from the queue are pending transmission is identified. If the quality of the channel drops below a predetermined level ($\delta$), the bandwidth allocation to the queue will be updated to zero. Otherwise, the queue will be granted its full nominal allocated bandwidth, provided that the maximum allocated bandwidth that may be used for preserving allocated bandwidth for selected flows has not been exceeded and that the allocation does not exceed a predetermined fair share ($\gamma$) of the aggregate nominal bandwidth allocated to the station. When these conditions are no longer met, the algorithm divides the remaining unallocated bandwidth ($B_T - X$) among the remaining queues such that the updated allocated bandwidth of each of the remaining queues is a proportional share, with respect to its nominal allocated bandwidth, of the remaining unallocated bandwidth.

Figure 7:
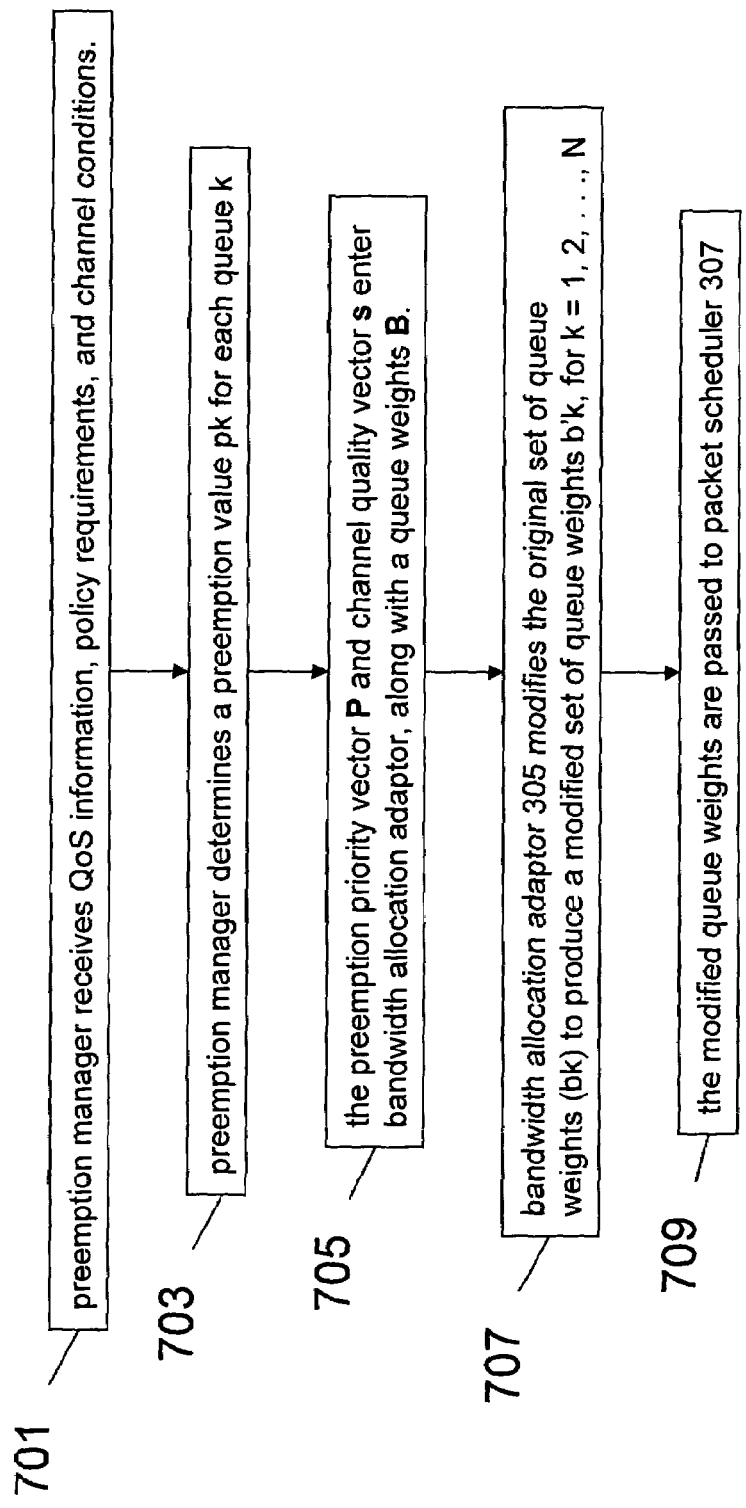
FIG. 7 is a more-generalized flow chart showing operation of the scheduler of FIG. 3 in accordance with the preferred embodiment of the present invention.

FIG. 7 is a more-generalized flow chart showing operation of the scheduler of FIG. 3 in accordance with the preferred embodiment of the present invention. The logic flow begins at step 701 where preemption manager 303 receives QoS information, policy requirements, and channel conditions. As discussed above QoS information typically comprises a pre-negotiated quality for transmission for each flow based on a corresponding service level agreement, while channel conditions comprise a link quality $\sigma(j)$, for each particular channel j. Based on this information, at step 703 preemption manager 303 determines a preemption value $p_k$ for each queue k, where $p_k \in \{0, 1, 2, \ldots, P\}$ and k=1, 2, ..., N.

Continuing, at step 705 the preemption priority vector P and channel quality vector a enter bandwidth allocation adaptor 305, along with a queue weights B. As discussed above, the queue weights $b_k$ are determined by bandwidth manager 301, as known in the art based on a predetermined bandwidth management algorithm.

At step 707 bandwidth allocation adaptor 305 modifies the original set of queue weights ($b_k$) to produce a modified set of queue weights $b_k'$, for k=1, 2, ..., N according to the flow discussed above, and with reference to FIG. 6. As discussed above, the algorithm that determines the modified queue weights utilizes a logic flow that progressively determines a queue weight for queues, starting with the queue with a highest preemption value. Finally, at step 709 the modified queue weights are passed to packet scheduler 307. Packet scheduler then utilizes the modified queue weights when pulling data from queues 313. More particularly, a weight ($b_k'$) is assigned to each queue 313. Packet scheduler 307 utilizes the modified queue weight to appropriately order the transmission of data from queues 313 such that each queue receives a portion of available bandwidth in accordance with its weight.

While the invention has been particularly shown and described with reference to a particular embodiment, it will be understood by those skilled in the art that various changes in form and details may be made therein without departing from the spirit and scope of the invention. For example, the CHARM scheduler can be extended to support per flow (i.e., flow refers to individual flows) bandwidth adaptation. In case of per-flow queuing and bandwidth allocations, it is possible that hierarchical policy based decision algorithm may not be able to strictly order the flows (for soft preemption) based on policy. In another embodiment of the present invention, the preemption priorities associated with the N queues are not distinct, such that $p_r \geq p_s$ if $1 \leq r < s \leq N$. Specifically, two or more queues (i.e., flows in this case) may belong to the same soft pre-emption class. As a result, when dynamic bandwidth adaptation is done, and there is insufficient bandwidth to allow all the flows belonging to a particular class to be allocated their full bandwidth allocations, some rule is needed to allocate the bandwidth among the flows within the same class. One method is to somehow order the flows within a class using some other criteria e.g. one possibility is to order the flows that belong to the same preemption class randomly based on some random number generation technique. Another method is to have some alternative pre-configured criteria for breaking the preemption tie.

However, using some arbitrary method for resolving the tie among the flows belonging to the same class can result in potential unfairness in the system. As a result, in an alternate embodiment of the present invention preemption is done on a class level, and the classes are determined by a hierarchical policy-based decision tree. For this purpose, the bandwidth allocation for a class is taken to be the sum of the bandwidth allocations of all the flows belonging to that class. Once the dynamic bandwidth allocation algorithm determines the bandwidth allocations for the various classes, the bandwidth allocation for a particular class is distributed among the flows belonging to that class in proportion of their bandwidth allocations. This can be done by either computing the individual bandwidth allocations or by modifying the scheduler to implement it in two stages as is shown in FIG. 4. Here, the CHARM algorithm operates at the level of the classes distributing the available bandwidth among the various flow classes based on the algorithm described in the previous section. For each class, there is a fair scheduling algorithm that schedules the transmissions from the various flows constituting that class.

The invention claimed is:

1. An apparatus comprising:
a preemption manager for receiving a Quality of Service (QoS) and channel quality information and outputting preemption values; and
a bandwidth allocation adaptor for receiving queue weights, the channel quality information, and the preemption values, and outputting modified queue weights based on the queue weights, the channel quality information, and the preemption values;
wherein the channel quality information comprises a plurality of effective link rates, each link rate associated with a shared channel from a source station to one of a plurality of destination stations in a shared medium network and determined by accounting for loss in throughput due to error losses in the shared channel.

2. The apparatus of claim 1 further comprising a packet scheduler having the modified queue weights as an input, and scheduling packets based on the modified queue weights.

3. The apparatus of claim 2 further comprising:
a plurality of data queues coupled to the packet scheduler, wherein each data queue within the plurality of data queues has an associated service-level agreement.

4. A method comprising the steps of:
receiving a channel quality vector ($\sigma$) wherein the channel quality vector comprises a plurality of effective link rates, each link rate associated with a shared channel from a source station to one of a plurality of destination stations in a shared medium network and determined by accounting for loss in throughput due to error losses in the shared channel;
receiving preemption values (P), wherein P is based on the QoS and the channel qualityinformation;
receiving original queue weights (B); and
calculating modified queue weights (B') based on $\sigma$, P, and B.

5. The method of claim 4 further comprising the step of:
outputting B'to a packet scheduler, wherein the packet scheduler utilizes B'for scheduling packets.

* * * * *